TELEVISION SYNC SEPARATOR

Filed Sept. 18, 1948

2 SHEETS—SHEET 1

INVENTOR
Karl R. Wendt
BY
ATTORNEY

June 17, 1952 K. R. WENDT 2,601,191

TELEVISION SYNC SEPARATOR

Filed Sept. 18, 1948 2 SHEETS—SHEET 2

INVENTOR
Karl R. Wendt
BY
ATTORNEY

Patented June 17, 1952

2,601,191

UNITED STATES PATENT OFFICE 2,601,191

TELEVISION SYNC SEPARATOR

Karl R. Wendt, Hightstown, N. J., assignor to Radio Corporation of America, a corporation of Delaware Application September 18, 1948, Serial No. 49,938

1 Claim. (Cl. 178—7.3)

Figure 1:
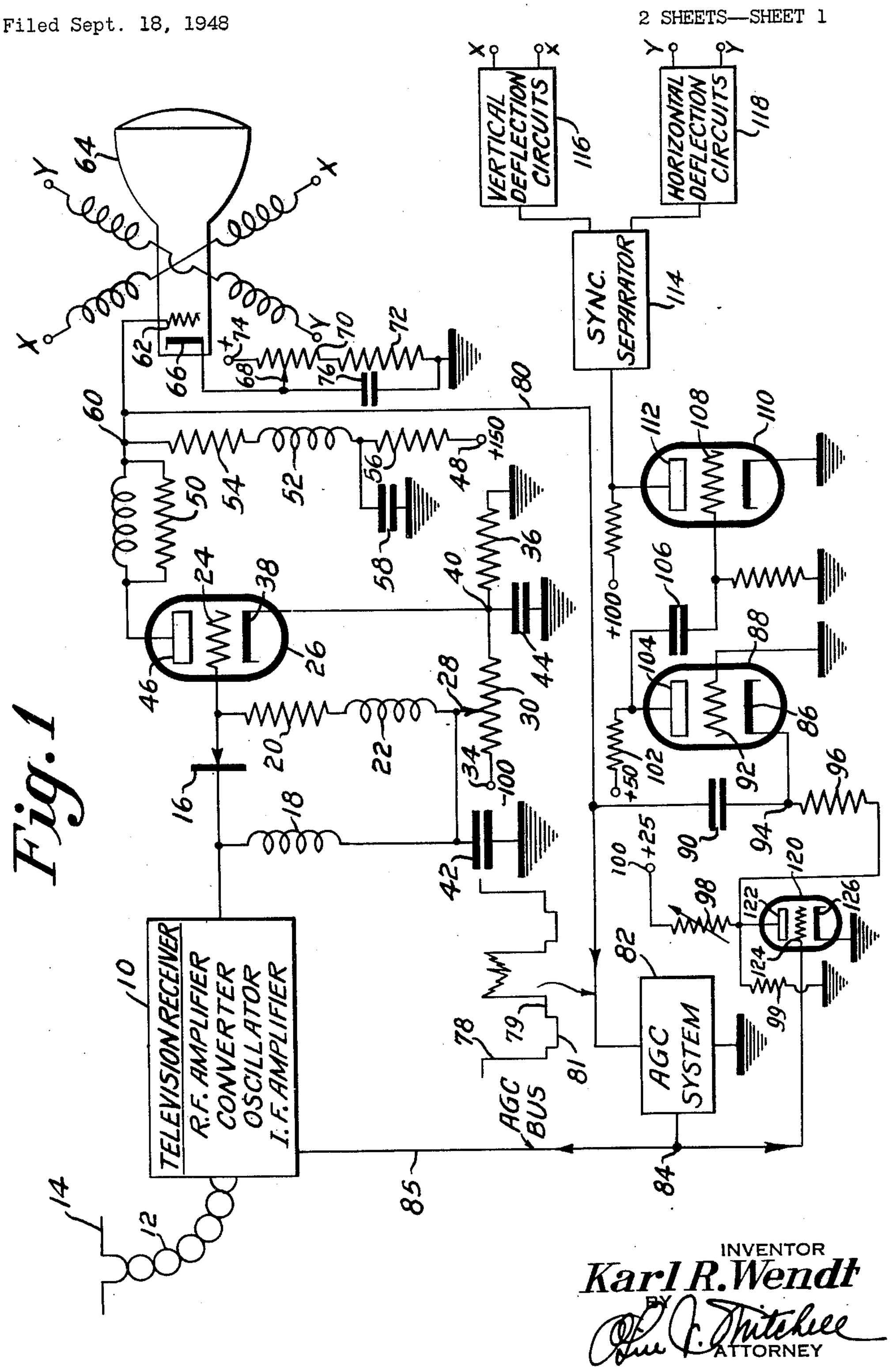

The present invention relates to signal separating circuits and more particularly, but not necessarily exclusively, to amplitude discriminatory signal translating circuits for effecting separation of certain applied signal components on the basis of predetermined amplitude levels.

In the embodiments of the invention given by way of example, signal separating circuits of the type employed to separate horizontal and vertical sync information from composite video signals in present day television systems are caused to function in a novel manner.

As is known to those skilled in the art, which forms the setting of the illustrative embodiments given herein, present television standards employ a composite type of video signal which comprises a series of image signals interspersed with periodically recurring black level signals upon which are situated in pedestal-like manner, sync pulses, which when obtained or selected in suitable form from a composite signal, time the action of receiving circuit deflection systems in accordance with corresponding portions of the equipment originating the video signal. The effective selection of the sync pulses requires considerable accuracy anad since the amplitude of the sync component of the video signal is held at a certain percentage of overall signal amplitude, a separating instrumentality, such as sync separating circuits, must be employed which at least responds, under normal conditions, to only a predetermined amplitude of the applied video signal. In accordance with the present invention, accuracy of coincidence of a part or point of a received video signal with respect to the response point of the separating instrumentality is automatically maintained, regardless of variations in applied signal amplitude.

Present television standards in the United States require that the peak or sync pulses represent 100 percent carrier modulation, whereas image black level reference is maintained at 75 percent carrier modulation. Thus, it appears that under normal conditions, circuits responding to the upper 25 percent of applied video signal will in essence translate only desirable sync information and thereby provide the desirable sync separation function. Accordingly, embodiment of the present invention in conjunction with well known clipping circuits will permit this 25 percent or any other established percentage of the overall signal to be separated with extreme accuracy.

It is further apparent, however, that circuits responding only to a fixed percentage of applied signal will provide improper sync signal information should the signal be so distorted in its translation through the transmitting and reception system, as to render the relative amplitude relationship between peak composite signal amplitude and black level reference information other than that for which the separating circuit is designed. Such distortion may occur as the result of improperly function noise limiting circuits or as a result of overloading with consequent non-linearity of amplifier stages. In addition to these possible sources of error in connection with the operation of fixed percentage sync separating circuits, there also are errors which may come about by reason of the transmission of the D. C. picture level with sync signal separation being obtained through the use of conventional clamping circuits. With such arrangements, changes in D. C. picture level or average image illumination may cause the information derived from clamping circuits to vary sufficiently to cause errors in sync action of the receiver deflection circuits. Also the energy represented by bursts of noise may be stored by the clamping circuits and thus provide inaccurate sync signal clipping for a considerable period following the noise bursts.

Generally speaking, there is only one reliable standard on which signal clipping may be based at the receiver terminus; that being, the black level signal amplitude represented by the maximum amplitude of the received blanking signals. This is commonly referred to as the front and back porch portion of the pedestal-like configuration formed by the combination blank out and synchronizing signals. Under most circumstances, circuits operating to communicate signals bearing amplitudes in excess of the carrier strength represented by this blanking level and discriminate against signals having amplitudes less than this blanking level, will properly execute the functions of sync separation.

The present invention affords proper sync signal separation in television systems, as well as accurate discrimination of other types of electrical signals on an amplitude basis, by means of a novel arrangement which provides a controlled threshold on a gated type of amplifier. In television systems embodying the invention, the effective gate threshold is always proportioned to the received carrier amplitude corresponding to the black level reference of the composite video signal. Hence, variations in signal strength, as well as D. C. picture component, will in no wise affect the nature of information separated by the circuit and therefore virtually ideal sync separation or sync clipping action is provided.

It is, therefore, a purpose of the present invention to provide a novel variable threshold amplifying circuit which is automatically adjusted to respond to predetermined amplitude levels of applied signals upon which is based its discriminatory action against other predetermined portions of said applied signals.

It is another purpose of the present invention to provide an improved sync signal clipping or separating circuit for use in television receivers.

It is still another purpose of the present invention to provide novel sync signal clipping circuit for use in television systems which is substantially free, in its operation, from variations in D. C. image component.

Another object of the present invention resides in the provision of a novel form of signal separating circuit which is substantially noise free when used in combination in a radio receiving system employing an automatic gain control circuit.

Figure 2:
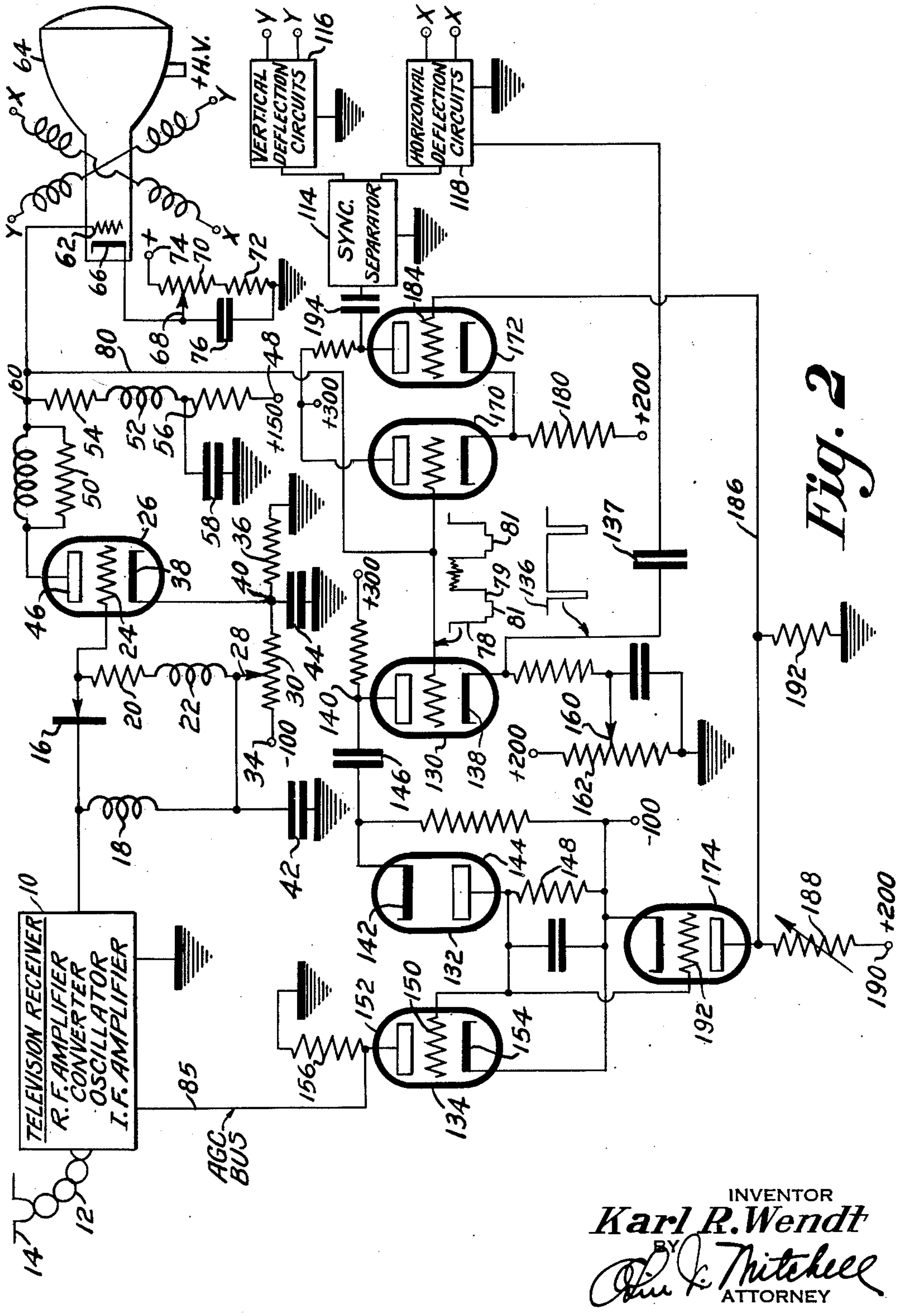

The novel features which are thought to be characteristic of the present invention are set forth in the appended claims. However, the invention itself, both as to its organization and mode of operation, will be best understood through reference to the following description especially when considered in connection with the accompanying drawings:

Fig. 1 illustrates an embodiment of the present invention in connection with one form of television receiving system; and Figure 2 is still another form of practicing the present invention in connection with television receiving systems.

In the drawings, similar elements will be assigned like reference characters.

Referring now to Fig. 1, the components of a typical television receiver are illustrated by block 10 which includes an R. F. amplifier, a convertor, an oscillator, and an I. F. amplifier. The radio frequency signals are applied to the R. F. amplifier section by means of transmission line 12 connected to antenna 14. The intermediate frequency version of the received video signal is then applied to a demodulating element such as 16 with its associated load circuit comprising elements 18, 20 and 22. After demodulation from the I. F. signal, the video signal is applied to the grid 24 of the video amplifier 26. The plate characteristic region over which the video amplifier 26 operates under excitation by the demodulated video signal is adjustable by positioning of tap 28 on potentiometer 30. This action obtains since one end of the potentiometer is connected with a source of negative potential 34 while the other end is connected to a bleeder resistor 36 to ground. The cathode 38 of the video amplifier vacuum tube 26 is then connected to the junction 40 of potentiometer and bleeder so that adjustment of the tap 28 will alter the control grid bias applied to the video amplifier. Suitable by-pass condensers 42 and 44 operate in a conventional manner to reduce the alternating current impedance of their connected terminal points with respect to ground. Polarizing potential for the plate 46 of the vacuum tube 26 is obtained from power supply terminal 48 through frequency compensating elements 50 and 52 connected in series with load resistor 54 and decoupling resistor 56. Decoupling capacitor 58 cooperates with the decoupling resistor 56 to isolate changes in video amplifier plate current from the plate polarizing power supply. In typical fashion, the terminal 60 of the video amplifier compound load circuit is direct current connected to the grid 62 of the kinescope 64 so that no additional circuitry need be provided for reinsertion of image background information. The overall brightness of the reproduced image may be readily adjusted by varying the potential of the kinescope cathode 66 which is accomplished through adjustment of tap 68 on potentiometer 70 forming in conjunction with resistor 72, a bleeder to ground from positive power supply terminal 74. Bypassing of the potentiometer tap 68 is conventionally provided by means of capacitor 76.

The amplified video signal applied to the grid 62 is also applied via circuit path 80 to the input of an AGC system represented in block form at 82. This AGC system operates to provide an output voltage available at terminal 84, which is substantially proportional to the carrier amplitude of the received video signal black level. This action may be obtained by a variety of circuit arrangements which are well known to those skilled in the art and since suitable circuit combinations for this purpose form no part of the present invention, detailed description of this portion of the receiving system is not deemed necessary.

It is only necessary to note that the magnitude and polarity of the voltage appearing at the output terminal 84 of the AGC system is such as to be suitable for application as a grid bias potential source for amplifier stages handling video signal. Consequently, the action of the AGC system will tend to keep the signal amplitude 78 applied to the kinescope grid 62, and the input of the AGC system 82, substantially constant regardless of variations in signal intensity as received by the antenna 14. As in all AGC systems of this general type, the maintenance of an absolutely constant amplitude signal is, of course, theoretically impossible since a change in signal amplitude 78 must exist in order for the AGC system to respond and apply a correcting voltage change to the AGC bus.

The amplified video signal 78 is also applied to the cathode 86 of sync clipper tube 88 by means of coupling capacitor 90 It is seen that the grid 92 of the sync clipper tube 88 is grounded and thus provides the equivalent of a diode connected to ground from terminal 94 of coupling capacitor 90. Correspondingly, a load resistor 96 is connected from the cathode 86 through a D. C. insertion resistor 98 (to be described hereinafter) and thence to a +25 volt potential source at terminal 100. The function of the D. C. insertion resistor 98 forms a part of the present invention, and, for the sake of clarity, its action will be described subsequent to the general description of the operation of the sync clipper 88.

In the normal operation of the sync clipper 88, the applied signal 78 polarized in a "sync negative" direction will cause the effective diode, comprising cathode 88 and grounded grid 92 to conduct and therefore produce a conduction current through resistors 96 and 98. The average of this current will in turn produce a positive potential at the cathode 86 which upon proper circuit adjustment can be made substantially proportional to the peak of the synchronizing signal 81 and thereby be proportional to the black reference level 79 of a standard video signal represented by 78. Under such conditions, and again with further proper adjustment, the effective diode may then be rendered conductive only by the sync pulse 81 or a portion thereof, and hence there will appear in the plate circuit load resistor 102 of the vacuum tube 88 current pulses resulting only from synchronizing signals. These current pulses will then produce voltage variations on the anode 104, which are in turn coupled by means of capacitor 106 to the grid 108 of sync amplifier 110. The voltage variations then appearing at the sync amplifier anode 112 are applied to a sync separator circuit such as 114 which discriminates between the horizontal and vertical synchronizing pulses and appropriately applies them to the vertical and horizontal deflection circuits, respectively shown at 116 and 118 for the timing thereof.

It may be pointed out at this time that the sync clipping circuit embodying vacuum tube 88 may be adjusted for a "constant percentage" type of or a "constant amplitude" type of clipping action. The bleeder resistor 99, connected with the D. C. insertion resistor 98 and load resistor 96 allows the potential initially applied to the cathode 86 to be adjusted by varying the value of resistor 98. For constant percentage type of clipping action, the initial potential applied to the cathode 86 is made relatively small so that during operation the voltage at the cathode 86 is largely dependent upon the grid current of the vacuum tube 88 caused by applied video signal 78. Thus, should the amplitude of the signal 78 change, the effective bias on the virtual diode comprising cathode 86 and grid 92 will be changed in a direction to maintain the clipping at the same percentage of the video signal amplitude. For example, increase in signal amplitude under the conditions when the circuit is clipping signal information having amplitudes just in excess of black level 79, will cause the average current through resistor 96 to increase, causing the cathode 86 to become more positive and thereby make the conduction threshold on the clipper 88 more negative, which tends to compensate for the increased signal amplitude. With this arrangement, however, the circuit action is vulnerable to changes in D. C. picture component (image background information) in that an increase in average picture intensity will cause the current through load resistor 96 to increase as in the case of increased signal amplitude and hence undesirably alter the clipping level of the circuit. To obviate this sensitivity to changes in D. C. picture component, the potential applied to the anode 86 (by adjustment of resistor 98, for example) may be sufficiently high that changes in current through resistor 96 due to changes in the character of the video signal 78 will cause a negligible change in the voltage appearing at the cathode 86. In this manner, constant amplitude type of clipping is approached and it is seen that variations in the nature of clipped signal information as the result of changes in image background information will be minimized. With this latter constant amplitude arrangement, the circuit is however undesirably sensitive to changes in applied signal amplitude since the bias on the clipper is not altered in accordance with changes in the applied signal as was the case in the constant percentage form of the circuit. Consequently, even though the AGC system 82 as shown, tends to keep the signal applied to the clipping circuit, through capacitor 90, at a constant amplitude this automatic gain control action is not perfect and subsequent variations in signal amplitude will cause variations in the nature of the signal separated from the composite signal 78. This of course will tend to upset the synchronization of the vertical and horizontal deflection circuit. Therefore in practice some compromise is made between the two modes of circuit operation with a net undesirable sensitivity to both changes in D. C. picture component and applied signal amplitude.

According to the present invention the clipping circuit incorporating vacuum tube 88 is operated as a controlled constant amplitude type of clipping circuit in such a way as to realize the advantages of immunity to changes in picture background level and still provide immunity to changes in amplitude of the applied signal. This is accomplished through vacuum tube 120 which has its anode 122 connected with variable resistor 98 through which it receives polarizing potential from source 100 and through which its anode current must pass. The grid 124 is, in turn, connected with the output terminal 84 of the AGC system 82, the cathode 126 being connected with ground potential. Hence, should the received signal at antenna 14 be reduced in intensity and consequently cause a reduction in amplitude of amplified video signal 78, the AGC terminal 84 will necessarily become more positive so as to increase the gain of the television receiver 10. As before noted, the correction will not be quite complete and the signal 78 will suffer a net reduction in amplitude. However, terminal 84 being connected with the grid 124 of vacuum tube 120 there will appear an increase in current through resistor 98. This increase in current through resistor 98 will cause the cathode 86 of the clipper tube 88 to become more negative and hence render more positive the level at which the vacuum tube 88 conducts. By suitable adjustment of circuit parameters this correcting voltage inserted in the load circuit, may be sufficient to maintain the clipping level of vacuuum tube 88 at the black level 79 of video signal 78 and under such conditions clipping action is rendered virtually free from changes in D. C. picture component as well as changes in actual applied signal amplitude due to incomplete AGC action. An increase in video signal amplitude 78 which would tend to cause the clipper tube 88 to pass more of the video signal, perhaps including actual image line information, will be offset by a negative swing of the potential at the terminal 84 hence causing cathode 86 to become more positive and making less positive the conduction threshold of the vacuum tube 88. It is to be noted that the potential applied to the plate 104 of the vacuum tube 88 may also be adjusted, if desired, in establishing the conduction level and clipping action of the vacuum tube 88 and consideration should be given its value as well as the cut-off characteristics of the tube 88 in practicing this particular form of the present invention.

The embodiment of the invention in Figure 2 is quite similar in operational principles to that shown in Figure 1 and is applied to a particular form of television receiver employing an inverted type keyed AGC system. This form of AGC system has exceptional noise immunity characteristics as well as maintaining an AGC correction potential which is proportional to the received radio carrier signal intensity corresponding to the black reference level of the composite video signal. This system is described in detail in U. S. patent application Serial No. 731,139 by Karl R. Wendt, filed February 26, 1947. In the operation of the receiver and associated inverted AGC system, the description given in connection with Figure 1 may be applied up to the production of video signal 78 at the terminus of connection 80 leading from kinescope grid 62. Again the signal 78 is applied to an AGC system, as was the case in Figure 1, the AGC system comprising vacuum tubes 130, 132, and 134 with associated circuit elements. In accordance with the U. S. patent application by Karl R. Wendt, supra, keying pulses 136 are derived from the horizontal deflection circuit 118 and applied through capacitor 137 to the cathode 138 of normally non-conductive vacuum tube 130 in such polarity and magnitude as to key the same into conduction during the back porch interval 79 of the received video signal 78. A series of pulses will then appear at the anode 140 which will be inversely proportional to the received signal intensity corresponding to the back porch level of the video signal. These pulses are then coupled to the cathode 142 of diode 144 through coupling capacitor 146. The vacuum tube 144 is connected as a simple peak detector form of rectifier so that the voltage appearing across the load resistor 148 and applied to the grid 150 of D. C. amplifier 152 will be proportional to the peak amplitude of the pulses derived from the vacuum tube 130. Reduction in signal strength will, of course, then increase the amplitude of applied pulses to the diode 144 and hence cause the grid 150 of the D. C. amplifier 152 to become more negative relative to its cathode 154. This, in turn, will cause the voltage drop across load resistor 156 to be reduced and thereby render the potential applied to the AGC bus 85 more positive to appropriately increase the amplification of the television receiver 10. The threshold of the AGC system is adjustable by means of tap 160 on potentiometer 162 which alters the positive potential of cathode 138 relative to ground and therefore determines the conduction level and consequent pulse amplitudes produced by the vacuum tube 130. It will be observed that even in this instance of AGC action, the amplitude of the signal 178 cannot be held at a constant amplitude since the correcting voltage applying to the AGC bus depends upon a net change in the signal 78 as applied to the vacuum tube 130.

Synchronizing signal separation is then accomplished by means of vacuum tubes 170 and 172 with the application of the present invention being accomplished by vacuum tube 174. Vacuum tube 170 is operated as a cathode follower type of amplifier which, by means of load resistor 180 common to the cathode circuit of vacuum tube 172, applies the composite video signal to the cathode of this clipper tube 172. The clipper tube 172 is normally established at cut-off by merit of proper adjustment of the voltage drop across resistor 180 and the normal potential applied to its grid 184 through connection 186 to resistor 188 which is, in turn, connected to a positive potential of +200 volts at terminal 190. Bleeder resistor 192 cooperates with the resistor 188 to allow the voltage at the grid 184 to be adjusted by varying the value of resistor 188. Thus, proper circuit adjustment will permit only synchronizing signal portions 81 of the composite video signal 78 to cause conduction of the vacuum tube 172 and thus amplify and apply these signals to the synchronizing separator 114 through coupling capacitor 194. After separation, the horizontal and vertical synchronizing signals are respectively applied to the vertical and horizontal deflection circuits 116 and 118 for timing thereof as in the case of Figure 1.

It may be appreciated that should the received signal be reduced in intensity, the amplitude of the applied video signal 78 to the amplifier 170 would suffer some net reduction which, in turn, will cause the clipper tube 172 to pass only a portion of the previously passed synchronizing signals 81. This, of course, may result in insufficient synchronizing signal as applied to the sync separator 114. On the other hand, should the signal 78 increase in amplitude sufficiently, the clipper tube 172 may be obliged to pass not only synchronizing information but also unwanted picture component.

According to the present invention, this undesirable action is again minimized, in this embodiment through the action of vacuum tube 174 whose plate current is controlled by the potential developed across load resistor 148 of the AGC detector 144. An increase in signal strength will cause the negative voltage applied to the grid 192 of vacuum tube 174 to become more positive and hence as a result of increased plate current through resistor 188 cause the grid 184 of vacuum tube 172 to become more negative. This, in turn, increased the threshold conduction level of the vacuum tube 172 in the negative direction sufficiently to maintain clipping of only that information of applied video signal having greater amplitude than the black signal reference level 79. A reduction in signal strength, of course, will be accompanied by the reverse action, wherein the grid 184 will be caused to become more positive and therefore permit conduction of the vacuum tube 172 by all signals in excess of the now reduced black reference level 79 and hence maintain clipping of only the desired synchronizing information.

Although in the foregoing description taken in connection with the drawings reference has been made to specific operating voltages and certain circuit arrangements, it is to be understood that such voltages, both as to their magnitude and polarity as well as associated circuitry, are only exemplary and other arrangements and forms of circuit parameters related in accordance with the teachings of the present invention may provide equivalent results. Also in the above drawings wherein well known circuit functions have been represented by block components, reference to the first edition of a John Wiley and Sons publication, "Television" by V. K. Zworykin and G. A. Morton, copyright 1940, will suggest numerous arrangements suitable for application in lieu of these block representations.

In summarizing, it is seen that the applicant has provided a simple, economical, and effective improvement in signal separating circuits, particularly when applied to television synchronizing signal separation and that the system provides accuracy, stability and noise immunity of such an unusually high degree that its use will contribute greatly to the improved performance of numerous varieties of electric wave communicating system.

I claim:

In a television receiver including a video amplifier having an output terminal and an automatic gain control circuit having an output terminal, a synchronizing signal separator circuit comprising a synchronizing signal separator tube having an input and an output, a connection between the output terminal of said video amplifier and the input of said synchronizing signal separator to apply demodulated television signals thereto with such polarity that the sync pulses tend to increase the conduction of said synchronizing signal separator, a threshold control circuit for said synchronizing signal separator tube including a unilateral conduction device having an anode, a cathode and a control electrode, a source of unidirectional potential having positive and negative terminals, a first resistance connected between the positive terminal of said source of unidirectional potential and the anode of said unidirectional conduction device, a second resistance connected between the anode of said unilateral conduction device and a point on the source of unidirectional potential, means connecting the cathode of said unilateral conduction device to the negative terminal of the source of unilateral potential, a connection between the output terminal of said automatic gain control circuit and the control electrode of said unilateral conduction device, and a connection between the anode of said unilateral conduction device and the input of said synchronizing signal separator tube to control the threshold thereof in such a way that an increase in received signal intensity will tend to reduce the conductivity of said synchronizing signal separator tube.

KARL R. WENDT.

REFERENCES CITED

The following references are of record in the file of this patent:

UNITED STATES PATENTS

| Number | Name | Date |
|---|---|---|
| 2,242,633 | Toulon | May 20, 1941 |
| 2,298,809 | Rhea | Oct. 13, 1942 |
| 2,307,375 | Blumlein et al. | Jan. 5, 1943 |
| 2,356,140 | Applegarth | Aug. 22, 1944 |
| 2,356,141 | Applegarth | Aug. 22, 1944 |

FOREIGN PATENTS

| Number | Country | Date |
|---|---|---|
| 845,897 | France | Sept. 4, 1939 |